United States Patent [19]

Grein et al.

[11] Patent Number: 5,042,298
[45] Date of Patent: Aug. 27, 1991

[54] FILLING-LEVEL INDICATOR

[75] Inventors: Nicolas Grein, Karlsruhe; Klaus Müller, Durmersheim, both of Fed. Rep. of Germany

[73] Assignee: Robert Bosch GmbH, Stuttgart, Fed. Rep. of Germany

[21] Appl. No.: 466,274
[22] PCT Filed: May 31, 1989
[86] PCT No.: PCT/DE89/00346
§ 371 Date: Feb. 16, 1990
§ 102(e) Date: Feb. 16, 1990
[87] PCT Pub. No.: WO90/00725
PCT Pub. Date: Jan. 25, 1990

[30] Foreign Application Priority Data

Jul. 7, 1988 [DE] Fed. Rep. of Germany ....... 3822993

[51] Int. Cl.$^5$ ............................................. G01F 23/28
[52] U.S. Cl. ................................................... 73/290 V
[58] Field of Search ...................................... 73/290 V

[56] References Cited

U.S. PATENT DOCUMENTS

| 2,910,999 | 11/1959 | Kimberly | 73/290 V |
| 3,133,442 | 5/1964 | Werner | 73/290 V |
| 3,229,523 | 1/1966 | Boyd et al. | 73/290 V |
| 3,512,400 | 5/1970 | Lynnworth | 73/597 |
| 4,213,337 | 7/1980 | Langdon | 73/290 V |
| 4,602,505 | 7/1986 | Kanda et al. | 73/579 |

FOREIGN PATENT DOCUMENTS 2402861  4/1979  France .

OTHER PUBLICATIONS

"New Instrumentation for Road Tankers", Measurement & Automation News (SIRA), (10-12)/1984, No. 54, 4 pages.

Primary Examiner—Daniel M. Yasich
Attorney, Agent, or Firm—Michael J. Striker

[57] ABSTRACT

In a filling-level indicator (12), especially for fuel tanks (10) of motor vehicles, flexural waves of the frequency (f) are fed into a sound conductor (11) via a transmitter (13). For the temperature compensation of the zero point of the filling-level indicator (12), the temperature coefficient of the modulus of elasticity (TKE) of the material of the sound conductor (11) will be at least of the order of magnitude of the negative amount of the temperature coefficient of the longitudinal extension (TKL). Furthermore, it has been shown to be especially advantageous to feed the flexural waves at a frequency $f_{opt} \approx 50$ kHzmm/d, (d) being the thickness of the sound conductor (11). A temperature compensation of the measuring sensitivity of the sound conductor is possible as a result of this measure. The filling-level indicator thereby supplies relatively accurate measurement values and is virtually independent of temperature influences within a wide temperature range.

4 Claims, 1 Drawing Sheet

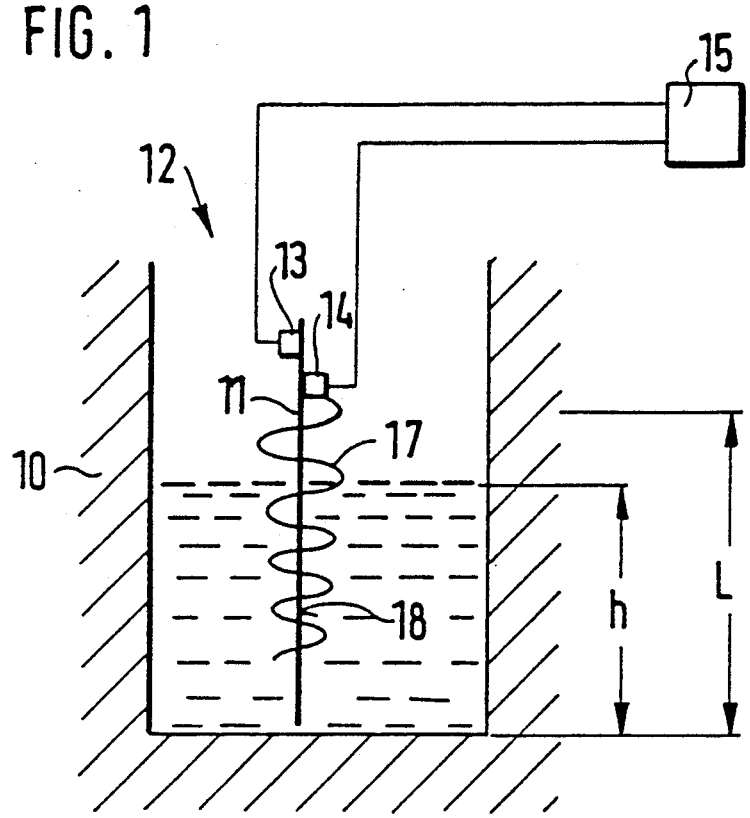
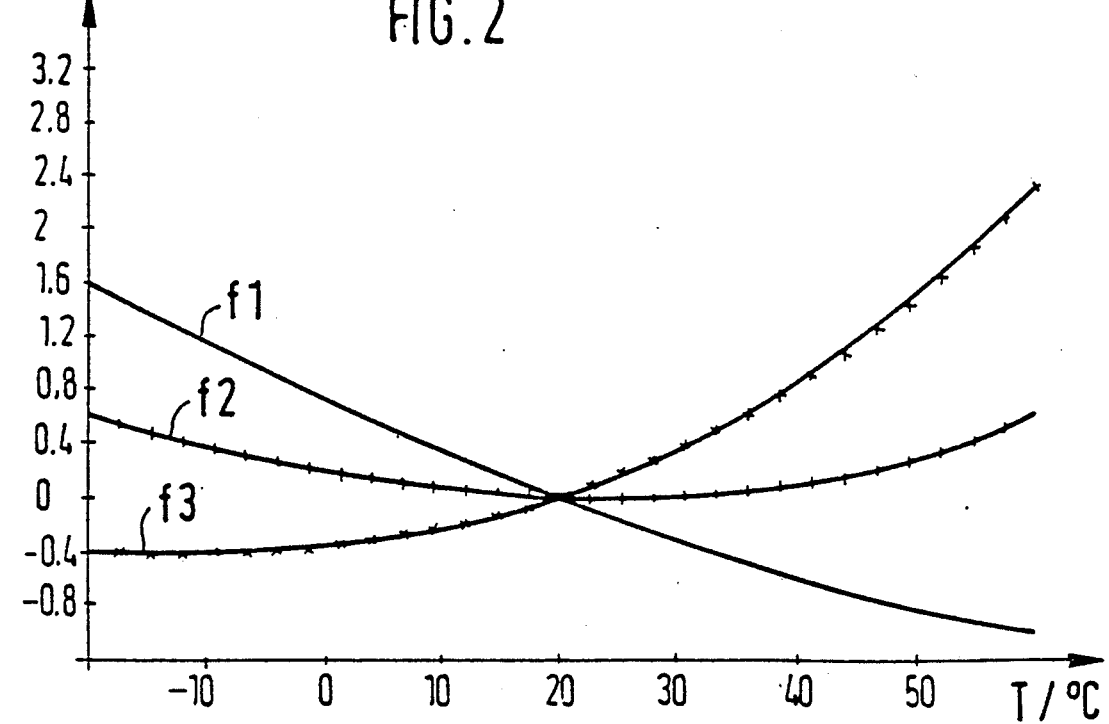

FILLING-LEVEL INDICATOR

BACKGROUND OF THE INVENTION

The invention relates to a filling-level indicator for fuel tanks and comprising a sonic transmitter, a sonic receiver, and a transmitting body extending into a fuel tank. It is already known to introduce sound into a sound-conducting solid body and determine the variation in the propagation velocity (phase velocity) of flexural waves with a receiver. The propagation velocity of the flexural waves in the solid body is a function of the height of the fluid level. The propagation velocity in the solid body in an empty fluid vessel serves as a reference value. Additional measurements are necessary to obtain this function. Furthermore, the transmitter and receiver should not come in contact with the fluid, otherwise disadvantages arise due to deficient sealing of the transmitter or the receiver or inadequate resistance of the points of adhesion. Also, the zero point and the measuring sensitivity of the filling-level indicator are temperature-dependent.

SUMMARY OF THE INVENTION

The object of the invention is to provide a filling-level indicator, having a very high accuracy of measurement and in which influence of temperature on the zero point and on the measuring sensitivity of the filling-level indicator is largely eliminated. The object of the invention is achieved by providing a transmitting body made of a material the temperature coefficient of modulus of elasticity of which, with an opposite sign, has substantially the same order of magnitude as the temperature coefficient of its linear extension. Thus, there is no longer any need for a reference stage or for a computational correction in an evaluation unit, this involving a high outlay. It is possible to do without a hitherto necessary additional determination of the influence of a temperature on the transmission body.

The present invention both as to its construction so to its mode of operation, together with additional objects and advantages thereof, will be best understood from the following detailed description of preferred embodiment with reference to the accompanying drawings.

BRIEF DESCRIPTION OF THE DRAWINGS

FIG. 1 shows schematically a longitudinal sectional view of the filling-level indicator according to the invention, and FIG. 2 shows a measurement diagram.

DESCRIPTION OF THE PREFERRED EMBODIMENT

In FIG. 1, 10 denotes a tank for the fuel of a motor vehicle, into which projects a transmitting body in a form of a sound conductor 11, of a filling-level indicator 12 for the quantity of fuel in the tank. The sound conductor 11 has a transmitter 13 and a receiver 14 at its upper end projecting out of the fuel. The transmitter 13 is designed as a transducer especially for ultrasonic waves. Both the transmitter 13 and the receiver 14 are arranged above the maximum filling height L of the tank 10, so that neither extends into the fuel. The effective filling height of the fuel in the tank 10 is designated by h. The transmitter 13 and the receiver 14 are connected to an evaluation device 15 not shown in detail.

The transmitter 13 excites in the sound conductor 11 sound waves 17, so-called flexural waves, that is to say transverse waves, the propagation velocity of which is frequency-dependent. Flexural waves are solid-borne sound waves on plates or bars, the oscillating particles of which are moved essentially perpendicularly to the plate plane and in the propagation direction. Furthermore, their propagation velocity in the region of the filling height h of the fuel is substantially lower than in that region L-h of the sound conductor 11 surrounded by the air above the fuel. As shown in FIG. 1, the sound waves 17 come in contact at the transitional surfaces 18 with the particular medium surrounding these. The propagation velocity of the sound waves 17 is determined by the size of the transitional surface 18 and is dependent on the geometrical form of the sound conductor 11. Depending on the filling-level height h, there is a greater or lesser variation in the propagation velocity (phase velocity) of the flexural waves. This measurement effect is also utilized in the filling-level indicator mentioned in the state of the art.

Temperature-dependent sources of error of the zero point of the filling-level indicator 12 include the temperature dependencies of the modulus of elasticity E of the sound conductor 11, its length L, its thickness D and the density $\delta$ of the material used. It has been shown to be especially advantageous that the temperature dependence of the zero point is compensated when the following is true of the material properties of the sound conductor:

$$TKE = -TKL.$$

TKE being the temperature coefficient of the modulus of elasticity E and TKL being the temperature coefficient of the linear extension L of the sound conductor 11. This condition is satisfied very effectively, for example, by the material Thermelast ® 4002 (Vacuumschmelze, Hanau). The temperature coefficient of the modulus of elasticity and that of the longitudinal extension L are given in the following table for various materials:

| Material | TKE [1/K] | TKL [1/K] |
|---|---|---|
| Copper | $-3.2 \times 10^{-4}$ | $1.7 \times 10^{-5}$ |
| Aluminium | $-3.1 \times 10^{-4}$ | $2.4 \times 10^{-5}$ |
| Steel (unalloyed) | $-2.0 \times 10^{-4}$ | $1.1 \times 10^{-5}$ |
| Thermelast ® 4002 | $-5.0 \times 10^{-6}$ | $8.5 \times 10^{-6}$ |

Furthermore, the influence on the propagation velocity of the flexural waves in the sound conductor 11 of the surrounding medium is dependent on the physical characteristics density and compression modulus, of the medium. The propagation velocity of the flexural waves is therefore also dependent on the sound velocity in the fluid. All these variables are temperature-dependent, and consequently the influence on the flexural-wave velocity is also temperature-dependent. It has been found, according to the invention, that this measuring error depends closely on the measuring frequency of the sound waves supplied by the transmitter 13. This temperature influence is as much the greater, the nearer the frequency is to the critical frequency at which the velocity of the flexural wave in the sound conductor surrounded by fluid is equal to that of the density wave in the fluid.

If the filling-level indicator is used for the tank of a motor vehicle, in general there is a working range of $-20°$ C. to $60°$ C. For this working range, there can be indicated a signal frequency f of the transmitter 13 at which the mean deviation in relation to the measuring sensitivity given at an assumed mean working temperature of 20° C. becomes the smallest possible. The concept of measuring sensitivity is intended to mean the change in velocity of the flexural waves as a result of the fluid load. If the frequency f of the transmitter 13 is selected as a function of the fluid data, the material data and the dimensions of the sound conductor, the measuring sensitivity of the fluid-level indicator is then falsified by the above-described parameters scarcely at all. The data of the fluid and the data of the material of the sound conductor are all already fixed. It has now emerged advantageously that the frequency $f_{opt}$ is approximately inversely proportional to the thickness d of the sound conductor 11. The optimum signal frequency $f_{opt}$ can be determined from the equation $f_{opt} = 50$ kHz mm/d. This indicated equation applies especially when the material used for the sound conductor 11 is Thermelast ® 4002 or even steel. In FIG. 2, the dependence of the measuring sensitivity as a function of temperature is represented for the three measuring frequencies $f_1 = 20$ kHz, $f_2 = 31$ kHz and $f_3 = 40$ kHz for this material and a size of $1000*10*1.5$ mm$^3$. Petrol is used as a medium here. The change $\Delta c/\Delta c_o$ in the flexural-wave velocity c as a result of the load of the medium, is plotted on the y-axis as the relative dependence of the measuring sensitivity. As is evident from FIG. 2, for the frequency $f_2 = 31$ kHz the maximum error in the temperature range of $-20°$ C. to 60° C. is below 0.8%, and therefore a mean error less than $\pm 0.4\%$ is achieved by an evaluation circuit.

If the two above-described methods for the temperature compensation of the measuring sensitivity and for the temperature compensation of the zero point are combined, a filling-level indicator independent of temperature over a wide temperature range is obtained.

While the invention has been illustrated and described as embodied in a specific embodiment of a filling-level indicator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A filling-level indicator for a fuel tank of a motor vehicle, comprising a transmitter for emitting sound waves; a receiver for receiving the sound waves; and at least one transmitting body projecting into the fuel tank, which is filled with a medium which level is to be determined, for transmitting the sound waves from said transmitter to said receiver, said transmitting body being formed of at least one sound-conducting material having a temperature coefficient of a modulus of elasticity thereof, with an opposite sign, substantially of the same order of magnitude as a temperature coefficient of a linear extension of said at least one transmitting body.

2. A filling-level indicator as set forth in claim 1, wherein said transmitter emits sound flexural waves having a frequency determined substantially from an equation $$f_{opt} = 50 \text{ kHz mm}/d,$$

wherein d is a thickness of said transmitting body.

3. A method of determining a filling level in a fuel tank of a motor vehicle, said method comprising the steps of providing a transmitter for emitting sound waves; providing a receiver for receiving the sound waves; and providing at least one transmitting body for projecting into the fuel tank, which is filled with a medium which level is to be determined, for transmitting the sound waves from said transmitter to said receiver, and formed of at least one sound-conducting material having a temperature coefficient of a modulus of elasticity thereof, with an opposite sign, substantially of the same order of magnitude as a temperature coefficient of a linear extension of said at least one transmitting body.

4. A method as set forth in claim 3, wherein the step of providing a transmitter includes providing a transmitter that emits sound flexural waves having a frequency determined substantially from an equation $$f_{opt} = 50 \text{ kHz mm}/d,$$

wherein d is a thickness of said transmitting body.

* * * * *